United States Patent [19]

Casasanta

[11] 4,164,618
[45] Aug. 14, 1979

[54] PLUG-IN SERVICE POLE ASSEMBLY

[75] Inventor: Salvatore J. Casasanta, Farmington, Conn.

[73] Assignee: The Wiremold Company, West Hartford, Conn.

[21] Appl. No.: 806,766

[22] Filed: Jun. 15, 1977

[51] Int. Cl.² .............................................. H02G 3/04
[52] U.S. Cl. ................................... 174/48; 339/91 R
[58] Field of Search ................. 174/48, 49; 362/431; D48/20 A; 339/124, 91 R

[56] References Cited

U.S. PATENT DOCUMENTS

| 1,820,824 | 8/1931  | Phiffer          | 174/57    |
| 2,895,119 | 7/1959  | Montgomery       | 339/91 R  |
| 2,965,751 | 12/1960 | Stiffel          | 362/431   |
| 3,094,584 | 6/1963  | Liberman         | 174/49    |
| 3,213,274 | 10/1965 | Stiffel          | 362/431 X |
| 3,609,211 | 9/1971  | Van Herk         | 174/49    |
| 3,781,567 | 12/1973 | Papsco           | 174/48 X  |
| 3,889,044 | 6/1975  | Flachbarth et al.| 174/48    |
| 3,909,502 | 9/1975  | Lacan            | 174/48    |
| 4,040,699 | 8/1977  | Rasmussen        | 339/91 R  |

Primary Examiner—Thomas J. Kozma
Assistant Examiner—D. A. Tone
Attorney, Agent, or Firm—Hayes & Reinsmith

[57] ABSTRACT

An assembly is disclosed featuring a service pole for installation in a room having an overhead power distribution system. The service pole itself is attachable and removable from a raceway of the overhead distribution system. The service pole features an adaptor cap at the top of the pole having plug-in blades for insertion into mating slots of a raceway receptacle.

4 Claims, 4 Drawing Figures

U.S. Patent    Aug. 14, 1979    4,164,618
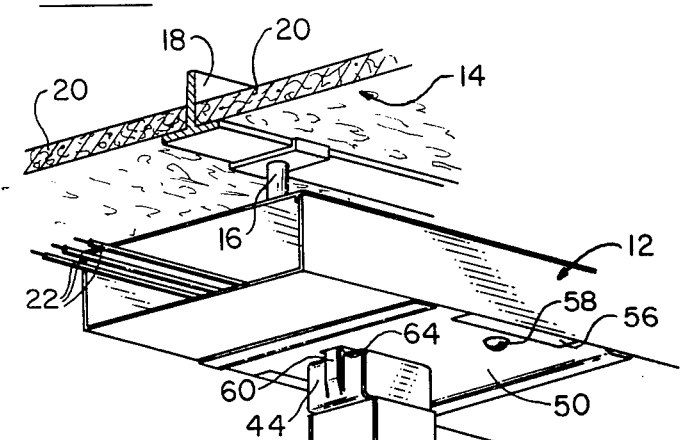
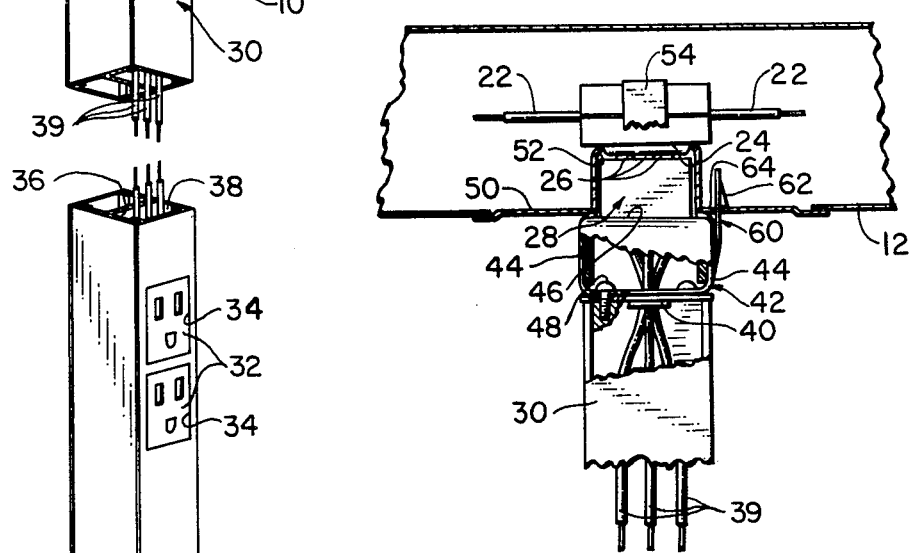
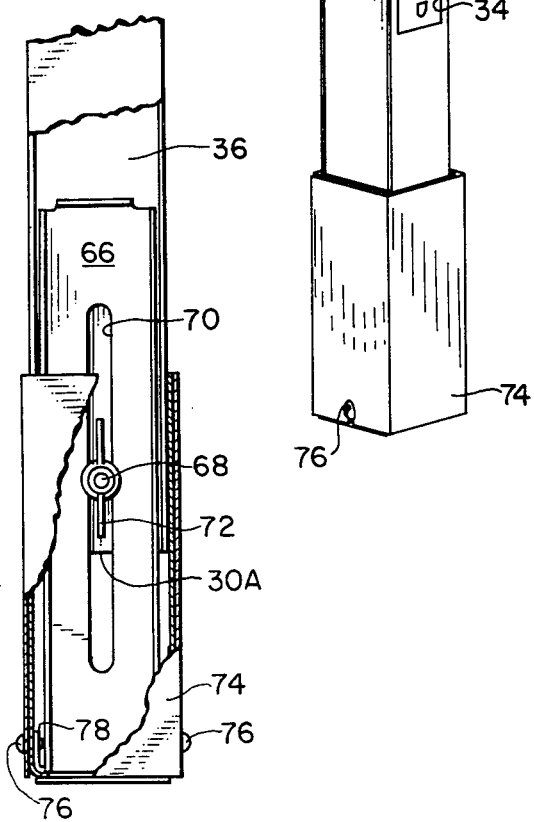
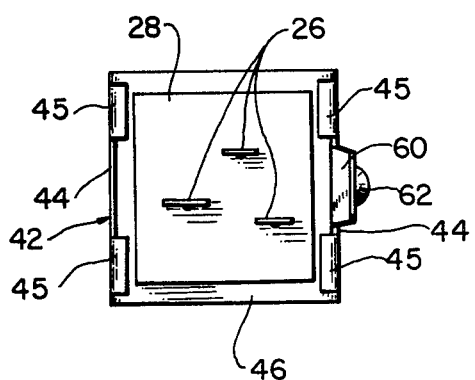

PLUG-IN SERVICE POLE ASSEMBLY

This invention generally relates to power distribution systems and particularly concerns a service pole assembly to be mounted in an upright position within a room for distributing power from an overhead electric wiring duct or raceway to selected points-of-use within the room.

A primary object of this invention is to provide a new and improved service pole assembly particularly suited to be attachable to and removable from an overhead raceway by means of a unique plug-in construction.

Another object of this invention is to provide such an assembly which is readily adjustable for installations having different height requirements.

A further object of this invention is to provide an assembly of the above described type which prevents accidental disassembly of the pole from the overhead raceway.

Yet another object of this invention is to provide such a new and improved service pole assembly designed for attachment in only one orientation of the service pole relative to its overhead receptacle.

Other objects will be in part obvious and in part pointed out more in detail hereinafter.

A better understanding of this invention will be obtained from the following detailed description and the accompanying drawing of an illustrative application of the invention.

In the drawing:

FIG. 1 is a perspective view of a service pole assembly incorporating this invention;

FIG. 2 is a side elevational view, partly broken away and partly in section, showing the top of the service pole of FIG. 1 connected with and secured to an overlying raceway receptacle;

FIG. 3 is an enlarged top end view of the service pole; and

FIG. 4 is an enlarged side elevational view, partly broken away and partly in section, showing an adjustment foot at the bottom of the service pole.

Referring to the drawing in detail, a service pole assembly 10 is shown for use with an overhead power distribution system for distributing electrical power to a room from an overhead electric wiring duct or raceway 12 to selected points-of-use within that room. The service pole 10 is of a general type shown in Flachbarth et al U.S. Pat. No. 3,889,044 issued June 10, 1975, and the raceway 12 is shown mounted below a suspended ceiling 14 on a hanger stem 16 which will be understood to be secured to a suitable ceiling suspension member such as the inverted T-bar 18 illustrated as providing support for ceiling panels 20.

The service pole assembly 10 of this invention can be mounted at any point along the raceway 12 to connect with wire conductors 22 within the raceway 12. To provide quick and easy installation in a uniquely simplified construction, an electric wiring receptacle 24 is illustrated as being mounted within the raceway 12 at a selected point along its length, and plug-in prongs or blades 26 of an adaptor plug cap 28 are provided at the top of service pole 30 for connection to the wire conductors 22 within raceway 12. The plug-in pole 30 of this invention has conventional power outlet receptacles 32 mounted within the hollow pole and having the receptacle faces exposed through suitable openings 34 in the pole 30. The latter is illustrated as having an internal central web 36 providing isolated compartments such as at 38 wherein prewired harnesses of receptacles 39 may be installed as shown to connect the pole receptacles 32 to the plug-in blades 26 through a smoothly edged opening 40 formed in the bottom of an adaptor supporting clamp 42 at the top of the service pole 30.

The adaptor plug cap 28 will be understood to be formed of any suitable insulating material, and the clamp 42 is a U-shaped body stamped from a strip of sheet metal with opposite legs 44 of the clamp 42 each having a pair of upper clamping fingers 45, 45 directed inwardly toward the opposite leg 44 to permit their being resiliently deflected apart by a camming action during assembly with the adaptor cap 28 and to spring back into clamping engagement with a surrounding ledge 46 on the adaptor cap 28 to hold the cap between the legs of the supporting clamp 42. The supporting clamp 42 in turn is preferably secured to the top of the service pole 30 by means such as the illustrated self-tapping screw 48 which will be understood to fix the base of the clamp 42 against the top of the pole 30 upon driving the screw 48 into locking position between the web 36 and adjacent molded ridges, not shown, inside the service pole 30.

For connecting to the plug-in service pole 30, the raceway 12 has a removable outlet fitting 50 which covers an opening in the bottom surface of raceway 12 overlying the desired location for the service pole 30. The fitting 50 has a recessed receptacle pocket 52 to which a snap-in clip 54 attaches mating receptacle 24 for plug-in engagement with the attachment prongs 26 of cap 28 upon its being inserted into the pocket 52. The outlet fitting 50 may be secured by any suitable means in the raceway 12 and preferably is provided with a latch 56 releasably secured by a fastener such as the screw illustrated at 58.

To prevent accidental or unintended disconnection of the service pole cap 28 from its raceway receptacle 24, an interlock 60 is provided to releasably lock the service pole 30 in operative position as illustrated in FIG. 2 to the overhead raceway 12. More specifically, the interlock 60 is provided by a resilient finger projecting upwardly from the base of the support clamp 42 a distance sufficient to be insertable into the confines of raceway 12. The extension finger 60 is formed of spring metal which projects upwardly in continuation with a leg 44 of the support clamp 42 and is bent and biased outwardly relative to its leg 44. The finger 60 has a resilient foot 62 which may be formed by punching the finger 60 to provide an outwardly projecting free lower edge which serves as a locking jaw 62. The interlock 60 thus formed is resilient to permit its being cammed inwardly upon passing through an opening 64 within the outlet fitting 50, and as the finger 60 is pressed upwardly through the opening 64, the locking jaw 62 snaps outwardly into locking engagement over an upper inside surface of the outlet fitting 50. The support clamp 42 and the adaptor plug cap 28 at the top of the service pole 30 thus are not only firmly held in position relative to the raceway 12, but also any force tending to withdraw the service pole from its illustrated operative position is effectively resisted by interlock 60, e.g., were the service pole 30 to be lifted off the floor responsive to an upward deflection of raceway 12. Moreover, the described interlock permits quick and easy manual release when desired by pressing in finger 60 toward plug-in cap 28 to permit pole withdrawal upon jaw 62 registering with the opening 64.

To ensure that the plug-in service pole 30 is properly connected without danger of its being plugged-in erroneously, the plug-in blades 26 are each clearly shown (FIG. 3) as being offset from one another on both the X and Y axes. The slots in the face of the receptacle 24 will be understood to be correspondingly formed in a complementary pattern to mate with the blades, thereby ensuring one-way mating engagement between plug-in blades 26 and receptacle 24.

To permit installation of the disclosed plug-in service pole 30 in rooms having varying height requirements, an adjustable foot 66 is provided for the bottom of pole 30. In the specifically illustrated embodiment, foot 66 is shown as being of a generally rectangular and elongated configuration which is dimensioned to be fitted inside the pole 30 for sliding engagement with its internal web 36. An opening, not shown, is formed in web 36 through which a suitable fastener such as carriage bolt 68 is inserted to extend through a slot 70 extending longitudinally along the foot 66 in registration with the opening in web 36. Accordingly, the foot 66 may be extended below the bottom 30A of the pole 30 and slidably adjusted to meet the height requirements of the room after the plug-in blades 26 of the cap 28 have been connected to receptacle 24. Upon floor bottoming engagement of the foot 66 with the pole 30 disposed in a stabilized upright position, the foot 66 and web 36 are positively secured in adjusted position, e.g., by tightening the illustrated wing nut 72. A two part foot cover 74 is preferably provided which will be understood to be formed of two mating elongated legs of C-shaped cross section which cover both the foot 66, protruding below the bottom 30A of the pole 30, and the adjoining bottom portion of pole 30. The cover 74 may be secured in position by any releasable locking means such as the illustrated self-tapping screws 76 which extend through lapping legs of cover 74 and secured to a flange 78 fixed to and extending upwardly from the base of the foot 66.

As will be apparent to persons skilled in the art, various modifications, adaptations and variations of the foregoing specific disclosure can be made without departing from the teachings of this invention.

I claim:

1. In a service pole assembly for distributing electrical power to a room from an overhead raceway and including a hollow elongated pole having outlet receptacles and internal wiring connected thereto, an improvement comprising an adaptor plug means on top of the pole having raceway receptacle plug-in blades connected to the internal wiring, the adaptor plug means including a supporting clamp fixed to the top of the pole and a plug-in blade mounting adaptor cap having an insulating body releasably assembled in snap-fitting relation to the clamp, the clamp having an upwardly extending spring finger and offset locking jaw movable into releasable locking engagement with the overhead raceway upon being inserted therein to resist a force tending to detach the plug-in connection.

2. The assembly of claim 1 wherein the plug-in blades of the adaptor plug means and corresponding raceway receptacle slots are respectively disposed in a pattern offset from one another to ensure one-way mating engagement between the plug-in blades and raceway receptacle.

3. The assembly of claim 1 further including a foot movable relative to the pole, and releasable locking means for securing the foot in a selected adjusted position relative to the pole for installations having different height requirements.

4. The assembly of claim 3 including a removable cover surrounding the foot and bottom of the pole.

* * * * *